United States Patent

[11] 3,596,715

| [72] | Inventor | William G. Halbert, Jr. Butte, Mont. |
| --- | --- | --- |
| [21] | Appl. No. | 3,062 |
| [22] | Filed | Jan. 15, 1970 |
| [45] | Patented | Aug. 3, 1971 |
| [73] | Assignee | Tenneco Oil Comapny Houston, Tex. |

[54] METHOD OF RECOVERING HYDROCARBONS WITH HIGHLY AQUEOUS SOLUBLE OILS USING PHOSPHATE ESTER SURFACTANTS
4 Claims, 1 Drawing Fig.

[52] U.S. Cl. ............................................. 166/274, 166/275
[51] Int. Cl. ....................................... E21b 43/22
[50] Field of Search ........................................ 166/268, 273—275; 252/8.55 D

[56] References Cited
UNITED STATES PATENTS

| 2,758,093 | 8/1956 | Ernst et al. | 252/DIG. 17 |
| --- | --- | --- | --- |
| 3,212,575 | 10/1965 | Fisher et al. | 166/274 |
| 3,275,075 | 9/1966 | Gogarty et al. | 166/274 |
| 3,330,346 | 7/1967 | Jacobs et al. | 166/274 X |
| 3,435,898 | 4/1969 | Thompson | 166/274 |
| 3,480,083 | 11/1969 | Oleen | 166/275 |
| 3,506,070 | 4/1970 | Jones | 166/274 X |

OTHER REFERENCES

Mayhew, R. L. et al. Phosphate Surfactants-Properties And Uses In Soap And Chem. Speciates, Apr. 1962, pp. 55— 58, 93, 95, May, 1962, pp. 80, 81, 167, 169 (Copy in 252-O.P.D. Digest)

*Primary Examiner*—Jan A. Calvert
*Attorneys*—Eugene S. Coddou and Lee R. Larkin ABSTRACT: A method for secondarily recovering hydrocarbons using soluble microemulsions which are highly resistant to phase separation due to water dilution and which are created by contacting certain hydrocarbons with an organic phosphate surfactant. The method for recovering hydrocarbons from underground formations includes the steps of injecting the soluble oil microemulsion through an injection well penetrating the formation. It also includes injecting an aqueous drive fluid through the injection wall, thereby displacing the hydrocarbon within the formation toward the second wellbore, and producing the oil to the surface through the second wellbore.

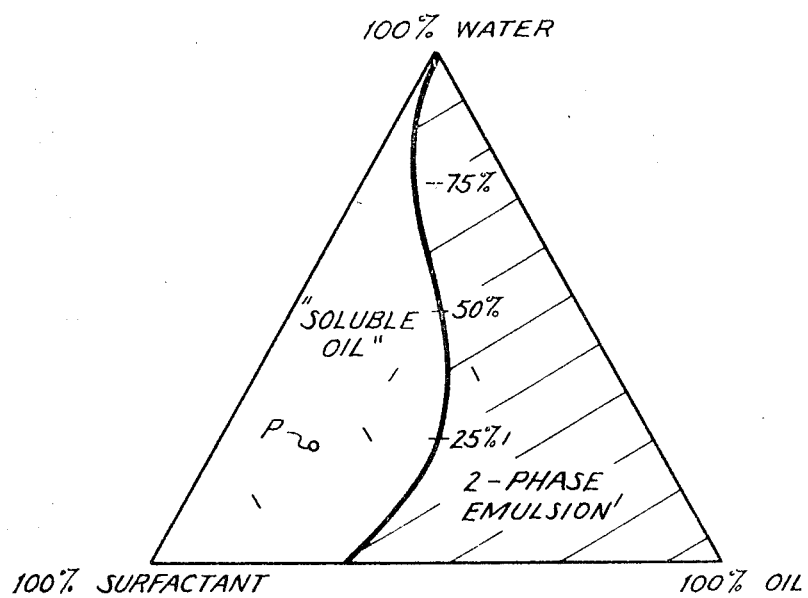

3,596,715

METHOD OF RECOVERING HYDROCARBONS WITH HIGHLY AQUEOUS SOLUBLE OILS USING PHOSPHATE ESTER SURFACTANTS

BACKGROUND OF THE INVENTION

1. Field of the Invention

This invention relates to a method for using a miscible oil-phosphate ester surfactant microemulsion for secondarily recovering hydrocarbons from an underground formation. More particularly, this invention relates to a method for secondarily recovering hydrocarbons from an underground formation using an improved soluble oil which displays highly desirable single-phase integrity characteristics when diluted to a great extent by a formation water or drive water.

2. Description Of The Prior Art

Transparent miscible dispersions of oil and water are described in U.S. Pat. Nos. 3,373,809 and 3,406,754. The soluble oils described therein are used as secondary recovery vehicles for petroleum deposits. The miscibility of soluble oils in general with the formation oils and water provides a reduced surface tension drive medium to more effectively cleanse a formation by secondary recovery techniques. These soluble oils are miscible with both oil and water within a relatively narrow composition range. As a soluble oil contacts and displaces native oil and water through a formation, it absorbs both fluids. Also, the soluble oil absorbs water from the fluid which drives it through the formation.

The leading edge of the slug of miscible soluble oil becomes too enriched in oil and the trailing edge becomes too enriched with water. Phase integrity is destroyed by both mechanisms and phase separation occurs in the displacing soluble oil so as to destroy the desired effect of a miscible drive fluid.

The phase separation described above must be avoided in order for the soluble oil to effectively cleanse the formation. The prior art has taught compositions of soluble oils which have the undesirable characteristics of oil and water phase separation when sufficiently diluted with either oil or water. In light of the present invention, it is presently thought that such shortcomings are probably due to the use of alkyl aryl sulfonates as the surfactant of such dispersions.

Soluble oils in the prior art which are very dilute in water are less effectively miscible with oil than those which are rich in hydrocarbon content. As the soluble oil suspension migrates through the formation, the drive water behind the slug and the native formation water in front of the slug combine to render the soluble oil ineffective in its displacement process.

SUMMARY OF THE INVENTION

An object of this invention is to provide an improved method of hydrocarbon recovery using a soluble oil microemulsion which is superior in dilution characteristics when diluted both with oil and water. An additional object of this invention is to provide an improved secondary hydrocarbon recovery method using the soluble oil which is not subject to the shortcomings of limited ranges of concentration as found in the prior art.

Briefly stated, this invention is for a process for secondarily recovering fluid hydrocarbons from subterranean formations penetrated by at least two well bores.

The method includes the step of contacting a liquid hydrocarbon with an organic phosphate surfactant in the presence of water to thereby produce a soluble oil microemulsion which resists phase separation when diluted with water. It also includes the additional steps of injecting through the first of the wellbores a slug of the soluble oil microemulsion, thereafter injecting an aqueous fluid through the first wellbore into the formation thereby miscibly displacing the hydrocarbon within the formation toward a second wellbore, and producing the hydrocarbon through the second wellbore.

In the preferred embodiment of the invention, the organic phosphate surfactant is an anionic monoorthophosphate ester.

Also in the preferred embodiment, the soluble oil microemulsion remains a single-phase system from the range of about one part surfactant to one part oil in a minimum water diluted state to about nine parts surfactant to one part oil in its near infinite dilution state.

In certain embodiments, the liquid hydrocarbon is chosen from the group consisting of crude oil, gasolines, refinery cuts and hydrocarbon solvents. Certain other embodiments include the additional step of admixing a strong base to the aqueous soluble oil prior to the surfactant injection step, whereby the miscibility of the dilute slug of soluble oil with the formation oils is enhanced.

BRIEF DESCRIPTION OF THE DRAWING

Reference to the drawing will further explain one presently preferred embodiment of the invention wherein a ternary mixture diagram is shown which illustrates the range of stable soluble oil combinations for the surfactant-oil-water system.

DESCRIPTION OF THE PREFERRED EMBODIMENT

The presently preferred embodiment of the process for secondarily recovering fluid hydrocarbons from subterranean formations penetrated by at least two wellbores consists of injecting a slug of soluble oil microemulsion into the formation. This soluble oil is prepared by contacting a liquid hydrocarbon with a monoorthophosphate ester anionic surface active agent in water solution. The liquid hydrocarbon may be crude oil, gasoline, refinery cuts or hydrocarbon solvents. A soluble oil prepared in this manner is highly resistant to phase separation caused by dilution with water. The soluble oil is characterized by its transparency, as opposed to the opaqueness shown by macroemulsions of oil and water.

The miscible soluble oil is then displaced through the oil-bearing formation by aqueous fluid drive techniques. Pure fresh water or native formation brine solution can be used to drive the soluble oil through the formation. Fluid dilution, which ordinarily reduces the effectiveness of other soluble oils, has little or no effect on a soluble oil of the present invention. The hydrocarbons and soluble oil are then recovered to the surface through a production well communicating with the formation.

Referring now to the drawing, wherein like letters refer to like parts, the ranges of concentration by volume for oil, water and surfactant are shown which will yield a stable soluble oil for use in miscibly displacing oil from an underground formation. The surfactant used in the drawing and in this embodiment is a free acid of an organic phosphate ester, of the type manufactured by Wyandotte Chemical Company, Wyandotte, Michigan, under the trade name Klearfac AA270 and AA420. The area labeled "soluble oil" sets out the limits of each constituent which will produce the desired microemulsion. The area labeled "2-phase emulsion" shows the area in which the ternary mixture undergoes the undesirable phase separation into aqueous and hydrocarbon phases. The range of concentration of surfactant and oil for which a single-phase soluble oil may be obtained varies from a mixture in the low water dilution range of about two parts surfactant to one part oil by volume. The single-phase mixture has the lowest surfactant to oil ratio, about one part surfactant to one part oil, in the 25—75 percent water dilution range. The highest ratio of surfactant to oil, about nine parts surfactant to one part oil, is found in the near-infinite water dilution range. For example, at point P in the drawing, the ratio of surfactant to oil to water is about 62 to 18 to 20. Point P illustrates a mixture which exists as a single-phase soluble oil microemulsion with the organic phosphate detergent and crude oil as the dispersed phase in a continuous water phase.

One advantage of this invention over the prior art is the resistance of the soluble emulsion to phase separation caused by water dilution. This microemulsion, prepared with an anionic monoorthophosphate ester surfactant, exhibits the completely unexpected result of resisting phase separation to substantially infinite dilution. This advantage over the prior art makes possible less expensive miscible displacement recovery methods. A smaller slug of soluble oil in relation to formation pore volume may be used than heretofore taught in secondary hydrocarbon recovery. As the soluble oil slug proceeds through the formation, dilution by drive water and formation water has no adverse effect on the ability of the slug to miscibly displace the oil therein.

Another advantage of the present invention is the improved solubilizing characteristics of the monoorthophosphate ester detergent. Microemulsions of improved stability can be created in saline solutions of certain ranges which could not be accomplished with alkyl aryl sulfonates. The surfactants used in the present invention perform well in strongly alkaline solutions, thus enabling their effective use in recovery processes which depend upon pH changes in injected water.

An alternate embodiment of this invention contemplates the addition of a strong base to the injected surfactant slug. Soluble oils which are very dilute in water sometimes display diminished miscibility with oil. In this embodiment, the action of both the "soluble oils" and the high pH are effective in reducing or eliminating the surface and the interfacial tensions which retard oil movement.

It is to be understood that the foregoing is generally illustrative only of the invention, and other embodiments thereof will be apparent to those skilled in the art in view of this description.

What I claim is:

1. In a process for secondarily recovering fluid hydrocarbons from a subterranean formation penetrated by at least two wellbores the combination of steps comprising:

contacting a liquid hydrocarbon with a free acid of an organic phosphate ester in the presence of water, to thereby produce a soluble oil microemulsion which resists phase separation when diluted with water;

injecting into said formation through the first of said wellbores a slug of said soluble oil microemulsion;

thereafter injecting an aqueous fluid through said first wellbore into said formation to thereby miscibly displace said hydrocarbon within said formation toward the second wellbore; and, producing said hydrocarbon through said second wellbore.

2. The invention as claimed in claim 1 wherein:

said liquid hydrocarbon is chosen from the group consisting of crude oil, gasolines, refinery cuts and hydrocarbon solvents.

3. The invention as claimed in claim 1 including:

admixing a strong base to said aqueous-soluble oil prior to said surfactant injection step whereby the miscibility of said dilute slug of soluble oil with the formation oils is enhanced.

4. The invention as claimed in claim 1 wherein:

said soluble oil microemulsion remains a single-phase system from the range of about one part by volume surfactant to one part by volume oil in a minimum water-diluted state to about nine parts surfactant to one part by volume oil in its near-infinite dilution state.